United States Patent [19]

Chabot

[11] Patent Number: 4,756,119
[45] Date of Patent: Jul. 12, 1988

[54] BASE SUPPORT FOR SEED TRAYS

[75] Inventor: Jean-Marie Chabot, St-Damien, Canada

[73] Assignee: Les Industries Provinciales Ltee, St. Damien, Canada

[21] Appl. No.: 846,138

[22] Filed: Mar. 31, 1986

[51] Int. Cl.⁴ ............................................... A47G 7/00
[52] U.S. Cl. ........................................ 47/39; 108/127; 211/71; 248/439
[58] Field of Search ............ 47/18, 39, 40, 63, 84–87, 47/73, 77; 108/11–14, 25, 155, 90, 125–133, 43, 44, 46, 127; 211/71, 85, 126, 127, 132, 171, 201, 73, 74; 248/27.8, 150, 165, 166, 188.6, 439; 206/557, 562, 423

[56] References Cited

U.S. PATENT DOCUMENTS

| | | | |
|---|---|---|---|
| D. 248,935 | 8/1978 | Stutelberg et al. | 47/84 X |
| 573,756 | 12/1896 | Bergstresser | 248/166 |
| 1,688,407 | 10/1928 | Wastak | 206/557 |
| 2,189,510 | 2/1940 | Swaney | 47/63 |
| 2,524,135 | 10/1950 | Pittenger et al. | 248/166 |
| 2,829,705 | 4/1958 | Godshalk et al. | 108/129 |
| 3,244,125 | 4/1966 | Makey | 108/44 X |
| 3,394,666 | 7/1968 | Pearlman | 108/44 X |
| 3,825,126 | 7/1974 | Pohl et al. | 206/563 X |
| 3,889,416 | 6/1975 | Bergeron et al. | 47/39 |
| 3,938,281 | 2/1976 | Ingesstedt et al. | 47/84 |
| 4,010,696 | 3/1977 | Priesman | 108/44 X |
| 4,095,533 | 6/1978 | Leveille | 108/90 |
| 4,242,834 | 1/1981 | Olsen | 206/562 X |
| 4,251,951 | 2/1981 | Heinstedt | 47/39 |
| 4,279,101 | 7/1981 | Leroux | 47/64 |
| 4,299,054 | 11/1981 | Ware | 47/64 |
| 4,434,576 | 3/1984 | Sowerwine | 47/85 |
| 4,505,408 | 3/1985 | Sagol | 248/188.6 |
| 4,539,455 | 9/1985 | Colato | 108/19 X |
| 4,557,200 | 12/1985 | Geschwender | 248/439 |

FOREIGN PATENT DOCUMENTS

| | | | |
|---|---|---|---|
| 1050551 | 1/1954 | France | 108/155 |
| 8402108 | 2/1986 | Netherlands | 47/39 |
| 8500089 | 1/1985 | PCT Int'l Appl. | 47/86 |

Primary Examiner—James R. Feyrer
Attorney, Agent, or Firm—Nixon & Vanderhye

[57] ABSTRACT

The present invention comprises a tray which includes: a flat frame having a plurality of compartments, each having an opened bottom but in which may be seated a plant-growing cartridge; and retractable supports movable between a stored position, wherein they lie in the longitudinal plane of the frame, and an upstanding position, wherein they lie in a plane describing an angle of more than 90° with that of the stored position, thereby leaving a space beneath the frame to allow air circulation beneath the cartridges and to plants therein.

6 Claims, 3 Drawing Sheets

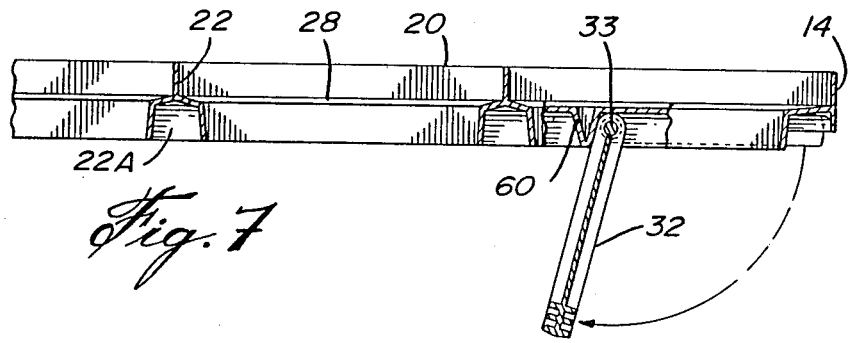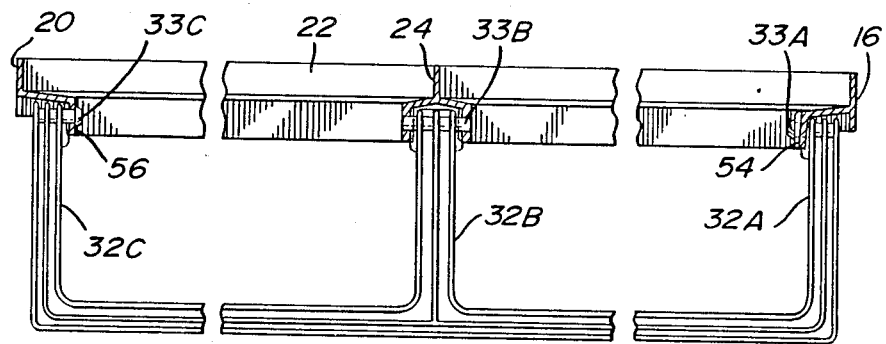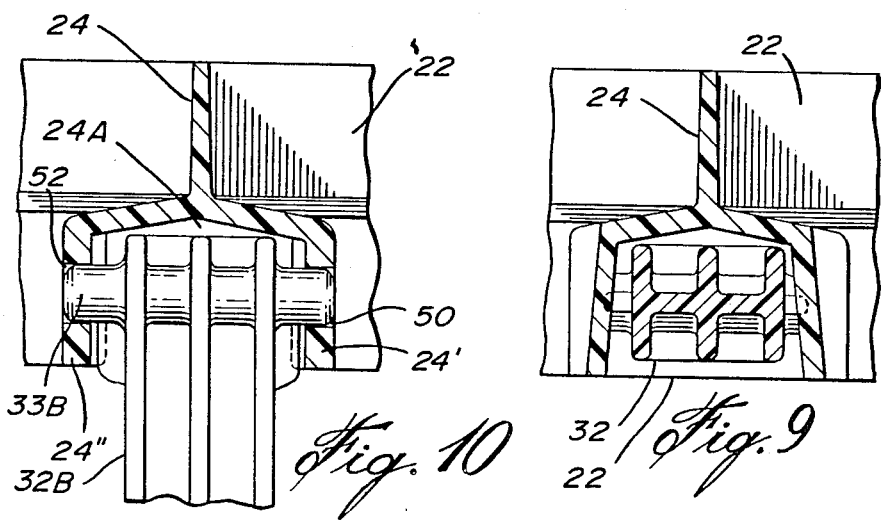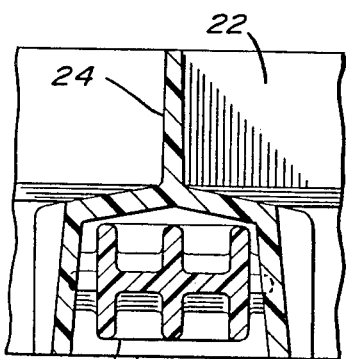

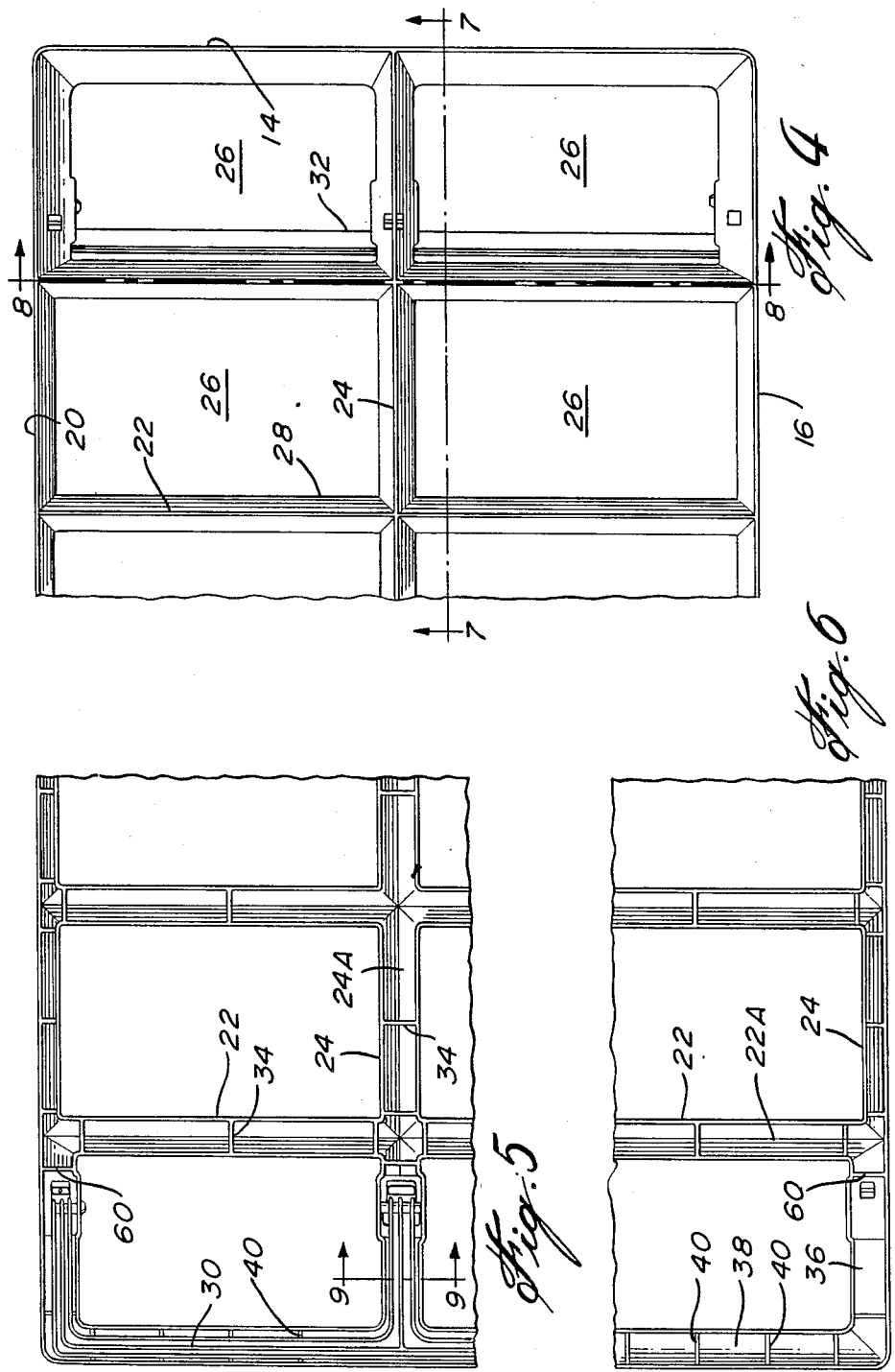

BASE SUPPORT FOR SEED TRAYS

FIELD OF THE INVENTION

The present invention relates to a tray for supporting plant growing cartridges used for cultivating plants.

BACKGROUND OF THE INVENTION

One present method of growing plants is described in U.S. Pat. No. 4,279,101 issued July 21, 1981 to Leroux; it consists of spreading soil over the bottom of a tray and roots are indistinctly plunged into the soil. This method leads expectedly to cross-linkage between roots as plants grow; consequently, if some of the plants are removed from the tray, there is a risk of damaging several roots, either that of the remaining plants or of those being removed. Another method of plant growing is described in U.S. Pat. No. 4,251,951 issued February, 1981; it consists of cultivating plants in slabs mounted on supported frames equipped with supporting rails. With this method, cross-linkage between roots is prevented; however, the stems are directly exposed to the surroundings and, during transportation of the tray, great care must be taken to avoid damaging the stems.

OBJECT AND STATEMENT OF THE INVENTION

It is an object of the present invention to provide a tray wherein cross-linkage problems are prevented so that plants could be removed easily from the tray without damage.

A further object of the invention is to provide a tray which allows efficient air circulation and drainage beneath the tray.

These objects are achieved with the present invention by providing a compartmented tray adapted to receive a plant growing cartridge in each of its compartments whereby it is the cartridge that bears the soil rather than the tray. Having a compartmented tray offers the option of cultivating several types of plants even though each type requires particular growth conditions.

The tray of the present invention is equipped with retractable support means which are adapted to move between a stored position, wherein the tray lies flat on the ground, and an upstanding position, wherein air circulation is permitted beneath the cartridges. In the latter position, the tray is used in the spring, summer or fall seasons while, in the ground-contacting position, it lies flat on frosted ground and snow accumulation on the tray is taken by the frame of the tray rather than by its support means.

The present invention therefore comprises, in its broadest aspect, a tray which includes: a flat frame having a plurality of compartments, each having an opened bottom but in which may be seated a plant-growing cartridge; and retractable support means which are movable between a stored position, wherein they lie in the longitudinal plane of the frame, and an upstanding position wherein they lie in a plane describing an angle of more than 90° with that of the stored position thereby leaving a space beneath the frame to allow air circulation beneath the cartridges and to plants therein.

BRIEF DESCRIPTION OF THE DRAWINGS

FIG. 4 is an enlarged top plan view showing one end of the tray;

FIG. 5 is an enlarged bottom plan view showing an opposite end of the tray with the support means in the stored position;

FIG. 6 is a bottom plan view of the opposite end of the tray with the support means removed;

FIG. 7 is a cross-sectional view as seen from lines 7—7 of FIG. 4;

FIG. 8 is a cross-sectional view as seen from lines 8—8 of FIG. 4;

FIG. 9 is a cross-sectional elevation view as seen from lines 9—9 of FIG. 5; and FIG. 10 is a view similar to that of figure 9 with the support means in the upstanding position.

DESCRIPTION OF PREFERRED EMBODIMENTS

Figure 1:
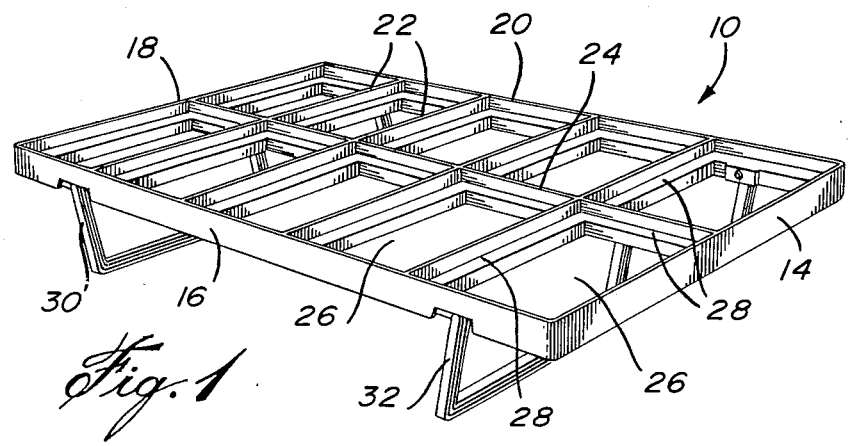
FIG. 1 is a perspective view of a tray made in accordance with the present invention.
Figure 2:
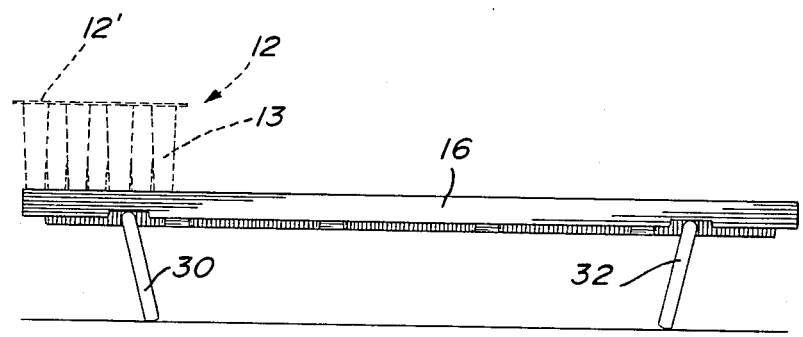
FIG. 2 is a side elevational view thereof with the support means in the upstanding position and with a plant growing cartridge shown in dotted lines.
Figure 3:
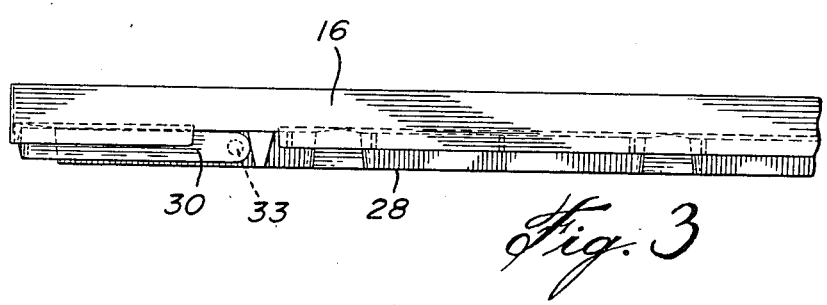
FIG. 3 is a side elevational view with the support means in the stored position.

Referring to FIGS. 1-3, there is shown a tray 10 adapted to support plant growing cartridges. These cartridges are formed of a unitary rigid plastic body 12 (shown in doted lines) having an integral upper surface 12' and a plurality of open-bottom cone-shaped planting cavities 13 extending downwardly from the upper surface. The planting cavities taper downwardly to a lower termination in a respective opening of substantially smaller size than its opening in the upper surface. An example of such a seedling cartridge may be found described in Canadian Pat. No. 936361, issued Nov. 6, 1973 to G. K. Todd.

The tray 10 is formed of a rectangular-shaped flat frame defined by four side walls 14, 16, 18 and 20 and of a series of transverse and longitudinal inner walls 22 and 24, respectively, defining a series of bottomless compartments 26. From the inner face of each wall inwardly extends a shoulder 28 on which rests a portion of the cones defined in the peripheral region of the cartridge unit.

The tray also includes a pair of support members 30 and 32 located at opposite ends thereof under the frame. These support members are pivotally mounted to the frame to reach an upstanding position (FIG. 2) or a stored position (FIG. 3).

Referring to FIGS. 5, 6 and 7, the bottom portion of walls 22 and 24 define channels 22A and 24A; the side walls of these channels are reinforced by means of longitudinally spaced transverse ribs 34. Similar channels 36 and 38 are formed at each opposite end of the frame; they, also, include a series of transverse reinforcing ribs 40. However, these ribs do not extend the entire depth of the channel so as to allow the support members 30 and 32 to be fully retracted therein when in the stored position; hence, when the tray is resting flat on the ground, the load is taken by the frame walls.

Each support member has three legs, (32A, 32B, 32C for support members 32), the upper end of which has an integrally formed pin 33A, 33B, 33C defining a pivot axis so that the support members 32 may pivot from an upstanding position, such as shown in FIG. 2, to a stored position, such as shown in FIG. 3.

The tray is preferably made of resilient plastic material to enable a slight expansion for the insertion of pins 33A, 33B, 33C in their associated openings in the side walls of the channels. Referring to FIG. 10, pin 33B is snap-inserted in openings 50 and 52 of side walls 24' and 24" of channel portion 24A of longitudinal wall 24; then, legs 32A and 32C of the support means are slightly pulled outwardly so that pins 33A and 33C may be forced into a snap-in engagement with their associated openings in side walls 54 and 56 of the frame.

Referring to FIG. 7, the support members 30 and 32 are shown in the upstanding position defining an angle with respect to the plane of the frame, which is greater than 90°, thus providing stability to the tray in that position. The under portion of the tray has stoppers, one of which is shown as 60, for limiting the movement of the support means 32 to the given angle.

Although the invention has been described above with respect to one specific form, it will be evident to the person skilled in the art that it may be refined and modified in various ways. Therefore, it is wished to have it understood that the present invention should not be limited in scope except by the terms of the following claims.

The embodiments of the invention in which an exclusive property or privilege is claimed are defined as follows:

1. A tray for supporting plant growing cartridges comprising:
   a frame including walls defining a plurality of compartments, each compartment having a through opening therein, means in said compartment for supporting a plant growing cartridge therein and in said through opening, said frame walls defining channels opening along the underside of said frame;
   retractable support means pivotally mounted to said frame, said support means including a pair of legs respectively pivotally mounted at respective points along said frame, said points being at least one leg length from adjacent opposite ends of said frame, respectively, each of said legs being pivotable beneath said frame through an arc greater than 90° between a stored position, wherein said legs lie in a plane generally parallel to said frame and in said channels, and an upstanding tray supporting position wherein each of said legs lies in a plane subtending an angle of more than 90° with the plane of said frame and said legs when the latter lie in their stored position, and
   stop means for maintaining said legs in said upstanding tray supporting position whereby a space is provided beneath said frame, when supported by said legs, to allow air circulation beneath said cartridges and to plants therein.

2. A tray according to claim 1 including longitudinally spaced reinforced ribs in said channels.

3. A tray according to claim 1 wherein said legs in said upstanding position are inwardly inclined one towards the other with the lower ends of the legs at respective opposite ends of the tray lying closer to each other than the upper ends thereof, the lower leg ends being displaced in a direction away from one another when said legs are pivoted from their upstanding tray supporting position into said stored position.

4. A tray according to claim 1 wherein said frame and said legs are formed of resilient plastic material.

5. A tray according to claim 4 wherein each of said legs includes pin means integrally formed at the upper end of each said leg, said pin means engaging corresponding holes in said frame.

6. A tray according to claim 5 including means for enabling said pin means to engage said frame in snap-in relation.

* * * * *